United States Patent
Horng et al.

(10) Patent No.: US 12,416,529 B2
(45) Date of Patent: Sep. 16, 2025

(54) TEMPERATURE SENSOR CIRCUITS AND CONTROL CIRCUITS AND METHOD FOR TEMPERATURE SENSOR CIRCUITS

(71) Applicant: Taiwan Semiconductor Manufacturing Company, Ltd., Hsinchu (TW)

(72) Inventors: Jaw-Juinn Horng, Hsinchu (TW); Chin-Ho Chang, Hsinchu (TW); Bei-Shing Lien, Taipei (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 392 days.

(21) Appl. No.: 18/150,772

(22) Filed: Jan. 5, 2023

(65) Prior Publication Data

US 2023/0384169 A1 Nov. 30, 2023

Related U.S. Application Data

(60) Provisional application No. 63/375,385, filed on Sep. 12, 2022, provisional application No. 63/365,330, filed on May 26, 2022.

(51) Int. Cl.
G01K 7/01 (2006.01)
(52) U.S. Cl.
CPC ..................... G01K 7/01 (2013.01)
(58) Field of Classification Search
CPC .............. G01K 7/01; G01K 2217/00
See application file for complete search history.

(56) References Cited

U.S. PATENT DOCUMENTS

| 6,008,685 A | 12/1999 | Kunst |
| 6,736,540 B1 * | 5/2004 | Sheehan ................. G01K 7/01 |
| | | 374/178 |
| 6,957,910 B1 * | 10/2005 | Wan ........................ G01K 7/01 |
| | | 327/512 |
| 8,915,646 B2 | 12/2014 | Wei et al. |
| | | (Continued) |

FOREIGN PATENT DOCUMENTS

| CN | 110377093 A | 10/2019 |
| DE | 102015109737 A1 | 12/2015 |
| | (Continued) | |

*Primary Examiner* — Patrick O Neill
(74) *Attorney, Agent, or Firm* — Finnegan, Henderson, Farabow, Garrett & Dunner, L.L.P.

(57) ABSTRACT

A temperature sensor circuit, a control circuit, and a control method are provided. The temperature sensor circuit comprises a temperature sensor and a control circuit. The control circuit is coupled to the temperature sensor and comprises a current source, a sampling circuit, and a computing circuit. The current source is configured to provide a first current and a second current to the temperature sensor in different time periods. The sampling circuit is coupled to the temperature sensor and configured to obtain and store a first voltage information and a second voltage information from the temperature sensor when the first current and second current are respectively provided. The computing circuit is coupled to the sampling circuit and configured to generate a sensing result corresponding to a difference of subtracting the second voltage information from the first voltage information.

20 Claims, 10 Drawing Sheets

(56) References Cited

U.S. PATENT DOCUMENTS

| | | |
|---|---|---|
| 9,804,036 B2 | 10/2017 | Ma et al. |
| 9,857,814 B2 | 1/2018 | Cohen et al. |
| 10,439,635 B1 | 10/2019 | Tang et al. |
| 10,488,269 B2 | 11/2019 | Welland |
| 11,077,308 B2 | 8/2021 | Opris et al. |
| 2009/0043521 A1 | 2/2009 | Lin |
| 2012/0326693 A1* | 12/2012 | Marten ............... G01K 7/01 323/304 |
| 2013/0301680 A1 | 11/2013 | Qiu |
| 2014/0314124 A1* | 10/2014 | Ash .................... G01K 7/01 374/183 |
| 2015/0003490 A1* | 1/2015 | Ash .................. G01K 15/005 374/1 |
| 2015/0372674 A1 | 12/2015 | Lang et al. |
| 2016/0054747 A1 | 2/2016 | Cohen et al. |
| 2019/0113393 A1* | 4/2019 | Sato ................. H03K 17/602 |
| 2019/0316973 A1 | 10/2019 | Ippolito et al. |

FOREIGN PATENT DOCUMENTS

| | | |
|---|---|---|
| DE | 112013006869 B4 | 5/2019 |
| TW | 202129239 A | 8/2021 |

* cited by examiner

TEMPERATURE SENSOR CIRCUITS AND CONTROL CIRCUITS AND METHOD FOR TEMPERATURE SENSOR CIRCUITS

CROSS-REFERENCE TO RELATED APPLICATIONS

The present application claims the benefit of priority to U.S. Provisional Application No. 63/365,330, filed on May 26, 2022, entitled "Temperature Sensor In 3DIC or Multi-Hot Spot Detection Application," and U.S. Provisional Application No. 63/375,385, filed on Sep. 12, 2022, entitled "Temperature Sensor Circuit, Control Circuit and Control Method of Temperature Sensor Circuit." All the aforementioned applications are incorporated by reference herein in their entireties.

BACKGROUND

With the population of mobile devices increasing, device miniaturization has become a factor in making consumer electronics smaller. However, as semiconductors devices are integrated on a smaller area, a thermal issue also arises regarding performance and reliability concerns. Therefore, an accurate and compact thermal sensor may be beneficial to monitor and control thermal issues within a chip.

BRIEF DESCRIPTION OF THE DRAWINGS

Aspects of the present disclosure can be understood from the following detailed description and the accompanying figures. It is noted that, in accordance with the standard practice in the industry, various features are not drawn to scale. In fact, the dimensions of the various features may be arbitrarily increased or reduced for illustration or clarity of discussion.

DETAILED DESCRIPTION

Figure 1:
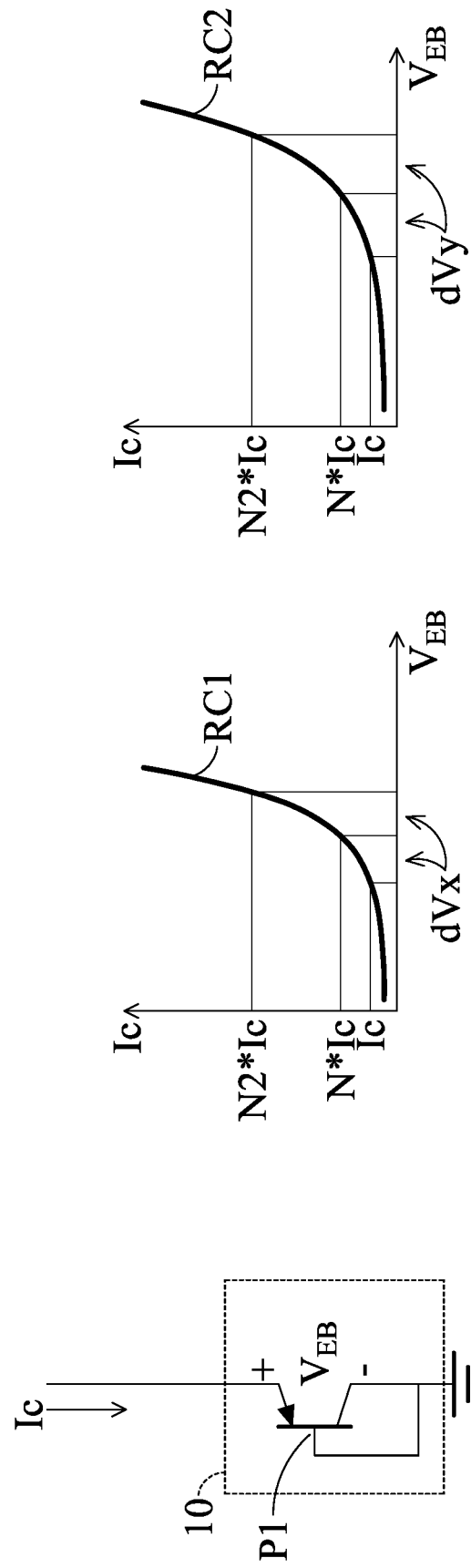
FIG. 1A illustrates a temperature sensor, in accordance with some embodiments.
FIGS. 1B, 1C illustrate relationship curves between collector currents and emitter-base voltages when a bipolar junction transistor (BJT) is operated at different temperatures, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper," "on," "over," and the like, may be used herein for ease of description to describe one element or feature's relationship to another element(s) or feature(s), including those illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Source/drain region(s) may refer to a source or a drain, individually or collectively dependent upon the context.

Bipolar junction transistors (BJT) are widely used as temperature sensors due to their linear characteristics over a wide operation voltage range with respect to temperature, which enables them becoming a suitable choice for realizing a high precision temperature sensor at a low cost. However, temperature sensors realized by BJTs usually require a reference circuit or reference voltage for calibration.

FIG. 1A illustrates a temperature sensor 10, in accordance with some embodiments. The temperature sensor 10 comprises a PNP type BJT P1. The BJT P1 is diode connected with its collector and base terminals coupled together to a ground voltage. Further, the BJT P1 is driven by a collector current $I_C$ received on its emitter terminal. Driven by the collector current $I_C$, a voltage $V_{EB}$ across the emitter-base terminals of the BJT P1 corresponding to a temperature of the location of the temperature sensor 10 may be generated by the BJT P1. That is, the temperature sensor 10 is capable of providing the emitter-base voltage as information related to a sensed temperature. Other types of transistors, such as types of BJTs, including NPN type BJTs, or gallium nitride (GaN) transistors, complementary metal-oxide-silicon (CMOS) transistors, are also within the scope of various embodiments.

FIGS. 1B, 1C illustrate relationship curves RC1, RC2 between collector currents $I_C$ and emitter-base voltages $V_{EB}$ when the BJT P1 is operated at temperatures Tx, Ty, i.e., at a location where temperatures are Tx, Ty, in accordance with some embodiments. In FIG. 1B, the relationship curve RC1 is obtained when the BJT P1 is operated at temperature Tx. Further, the relationship curve RC1 between the collector currents $I_C$ and the emitter-base voltage $V_{EB}$ of the BJT P1 may be derived as follows:

$$V_{EB1} = V_T \times \ln\frac{I_{C1}}{I_S}$$

-continued $$V_{EB2} = V_T \times \ln\frac{I_{C2}}{I_S}$$

$$dV = V_{EB1} - V_{EB2} = V_T \times \ln\frac{I_{C1}}{I_{C2}} = \left(\frac{kT}{q}\right) \times \ln N,$$

where $V_{EB1}$ denotes an emitter-base voltage when the BJT P1 is driven by a collector current $I_{C1}$, $V_{EB2}$ denotes an emitter-base voltage when the BJT P1 is driven by a collector current $I_{C2}$, $V_T$ denotes thermal voltage, $I_S$ denotes reverse saturation current, k denotes Boltzmann's constant, T denotes temperature (i.e., the temperature at the location of the BJT), and q denotes elementary charge. As can be seen above, a voltage difference dV is calculated by subtracting the base-emitter voltage $V_{EB2}$ from the base-emitter voltage $V_{EB1}$, and is related to the local temperature T and a ratio N between the collector currents $I_{C2}$, $I_{C1}$, i.e., $N=I_{C2}/I_{C1}$. In other words, a non-zero voltage difference dV positively related to the local temperature T may be obtained from the BJT P1 when the driven collector currents $I_{C1}$, $I_{C2}$ are not the same. For example, in FIG. 1B, when the BJT P1 is driven by the collector currents $I_C$, $N*I_C$, a voltage difference dVx of the emitter-base voltages $V_{EB}$ corresponding to the temperature Tx may be obtained. Further, since the voltage difference dV is only related to the local temperature T and the ratio N between the collector currents $I_{C1}$, $I_{C2}$, a same voltage difference dVx of the emitter-base voltages $V_{EB}$ corresponding to the temperature Tx may be obtained when the BJT P1 is driven by the collector currents $N*I_C$, $N^2*I_C$ provided that the temperatures at both currents $N*I_C$ and $N^2*I_C$ are the same.

In FIG. 1C, the relationship curve RC2 is obtained when the BJT P1 is operated at the temperature Ty higher than the temperature Tx. Based on derivation above, when the BJT P1 is driven by the same currents of $I_C$, $N*I_C$ at the temperatures Tx, Ty, the voltage difference dVy obtained when the BJT P1 is operated at the temperature Ty is greater than the voltage difference dVx obtained at the temperature Tx since the voltage difference dV of the emitter-base $V_{EB}$ is positively related to the local temperature provided that ratios between the collector currents are the same. As such, by keeping the ratio N between the collector currents $I_{C1}$, $I_{C2}$ fixed, the temperature information may be obtained from the voltage difference between emitter-base voltages of the BJT P1.

In at least one embodiment, the temperature sensor 10 is driven by currents to output corresponding voltage information. A temperature at the location of the sensor 10 can be calculated by referencing the voltage information provided from the same temperature sensor without additional reference circuits or reference voltages, thereby saving manufacturing cost of the temperature sensor 10. In at least one embodiment, it is possible to achieve one or more advantages including, but not limited to, better signal loss, higher sensing accuracy, and the same by driving the temperature sensor 10 with the collector currents $I_{C1}$, $I_{C2}$.

Figure 2:
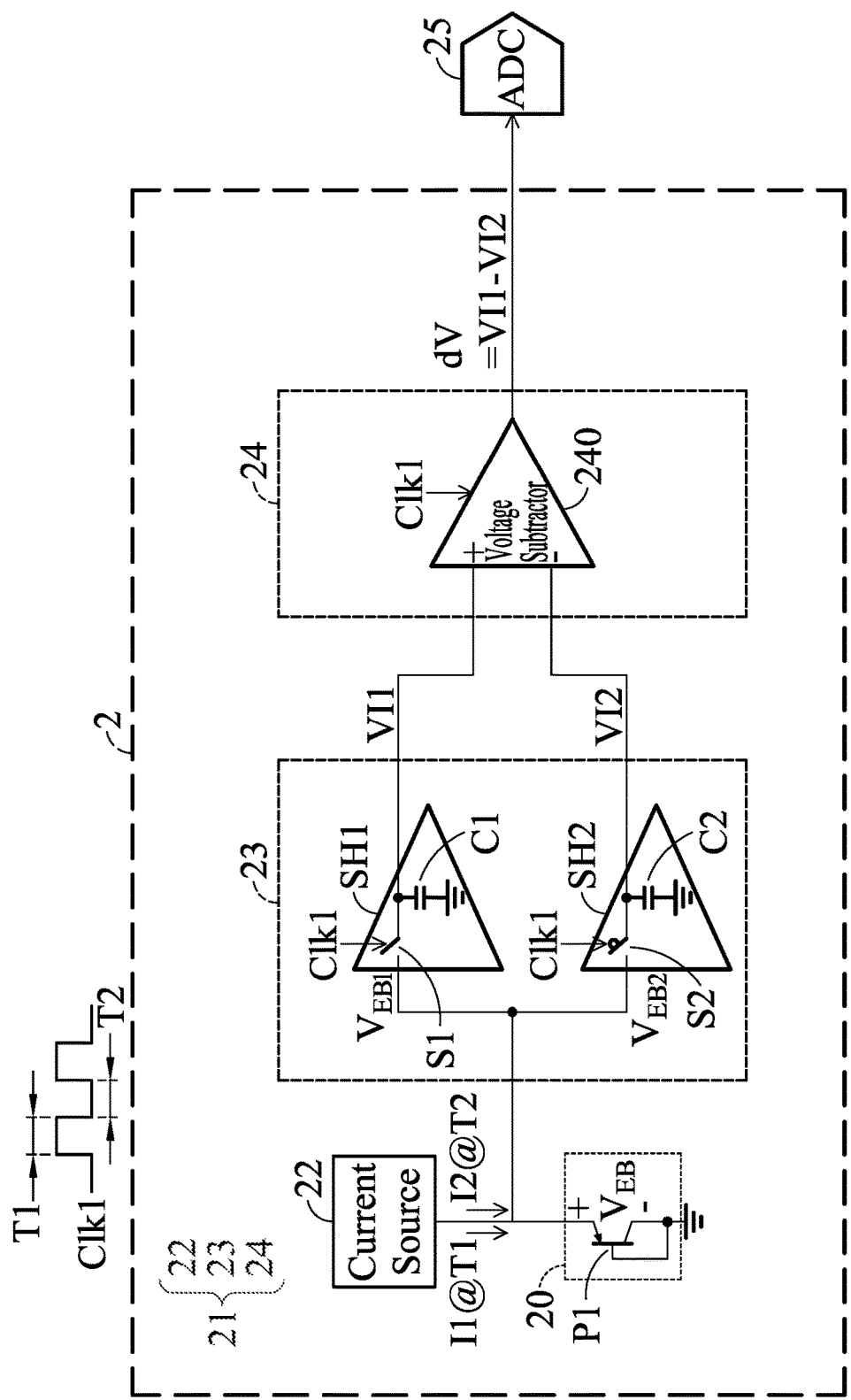
FIG. 2 illustrates a temperature sensor circuit, in accordance with some embodiments.

FIG. 2 illustrates a temperature sensor circuit 2, in accordance with some embodiments. The temperature sensor circuit 2 includes a temperature sensor 20 and a control circuit 21. The temperature sensor 20 is driven by the control circuit 21 to provide emitter-base voltages $V_{EB1}$, $V_{EB2}$ related to the temperature sensed. The control circuit 21 is configured to calculate a difference dV between the emitter-base voltages $V_{EB1}$, $V_{EB2}$, and output the difference dV as a sensing result representing the temperature information sensed by the temperature sensor 20.

The temperature sensor 20 comprises a diode connected BJT P1 with its collector and base being both coupled to a ground voltage. The BJT P1 receives a current at its emitter and generates a corresponding emitter-base voltage $V_{EB}$, which carries a temperature information as discussed above in relation to FIGS. 1A-1C.

The control circuit 21 is coupled to the temperature sensor 20 and receives the emitter-base voltages $V_{EB1}$, $V_{EB2}$. The control circuit 21 is configured to extract temperature information by calculating the difference dV between the emitter-base voltages $V_{EB1}$, $V_{EB2}$. In at least one embodiment, control circuit 21 outputs the difference dV as the sensing result corresponding to the temperature sensed by the temperature sensor 20, so the temperature information is represented as a voltage level of the sensing result.

The control circuit 21 comprises a current source 22, a sampling circuit 23, and a computing circuit 24. The current source 22 is configured to provide currents I1, I2 to the temperature sensor 20 in different time periods. The sampling circuit 23 is coupled to the temperature sensor 20 and configured to receive the emitter-base voltages $V_{EB1}$, $V_{EB2}$ provided from the temperature sensor 20 and store them as voltage information VI1, VI2 when the currents I1, I2 are respectively provided. The computing circuit 24 is coupled to the sampling circuit 23 and configured to generate the difference dV by subtracting the voltage information VI2 from the voltage information VI1. In some aspect, the control circuit 21 is configured to extract the temperature information represented by the voltage information VI1, VI2 and output it as a voltage level of the difference dV. Thus, the temperature sensed by temperature sensor circuit 2 may be obtained in digital form by an analog-to-digital (ADC) converter 25 by A-to-D converting the level of the sensing result.

More particularly, the current source 22 is configured to provide the currents I1, I2 to the temperature sensor 20 at different time periods. Since the currents I1, I2 are provided when the temperature sensor 20 is operated at the same temperature, the currents I1, I2 are provided in non-overlapping time periods within a range of 1 ps to 1 s. More particularly, in order to obtain the temperature information from the temperature sensor 20, the currents I1, I2 provided by the current source 22 are not the same, where the current I2 may be N times of the current I1. For example, the currents I1, I2 may be provided in different, e.g., consecutive, time periods T1 and T2 of a clock signal Clk1.

The sampling circuit 23 comprises sample and hold circuits SH1, SH2. In at least one embodiment, each sample and hold circuit comprises a switch and a capacitor. The switch is controlled by the clock signal Clk1 to be closed (conductive) or open (nonconductive), so the emitter-base voltages $V_{EB1}$, $V_{EB2}$ provided from the temperature sensor 20 are selectively provided to and stored by the capacitor. For example, the sample and hold circuit SH1 comprises a switch S1 and a capacitor C1. The switch S1 is controlled by a clock signal Clk1, and is closed in response to the clock signal Clk1 being at an enabled voltage level (e.g., logic 1), and open when the clock signal Clk1 is at a disabled voltage level (e.g., logic 0). On the other hand, the sample and hold circuit SH2 comprises a switch S2 and a capacitor C2. The switch S2 is controlled by the clock signal Clk1, and closed in response to the clock signal Clk1 being at the disabled voltage level (e.g., logic 0), and open when the clock signal Clk1 is at the enabled voltage level (e.g., logic 1). In other words, the sample and hold circuits SH1, SH2 are operated in complementary time periods. Thus, the sampling circuit 23 receives and stores the emitter-base voltages $V_{EB1}$, $V_{EB2}$ when the currents I1, I2 are respectively provided to the temperature sensor 20, e.g., successive half cycles of the clock signal Clk1. The sampling circuit 23 further provides the emitter-base voltages $V_{EB1}$, $V_{EB2}$ as the voltage information VI1, VI2 respectively to the computing circuit 24 for extracting the temperature information. Although FIG. 2 shows that the sample and hold circuits SH1, SH2 are driven by the same clock signal Clk1, various numbers of clock signals are also within the scope of various embodiments as long as the emitter-base voltages $V_{EB1}$, $V_{EB2}$ provided from the temperature sensor 20 are respectively received by the sample and hold circuits SH1, SH2.

The computing circuit 24 comprises a voltage subtractor 240 coupled to the sampling circuit 23. Specifically, the voltage subtractor 240 is coupled to the sample and hold circuits SH1, SH2 to receive and calculate the difference dV by subtracting the voltage information VI2 from the voltage information VI1. Since the difference dV between the voltage information VI1, VI2 carries the temperature information sensed by the temperature sensor 20, the voltage subtractor 240 converts the difference between the voltage information VI1, VI2 to an analog voltage level of the output sensing result.

Figure 3A:
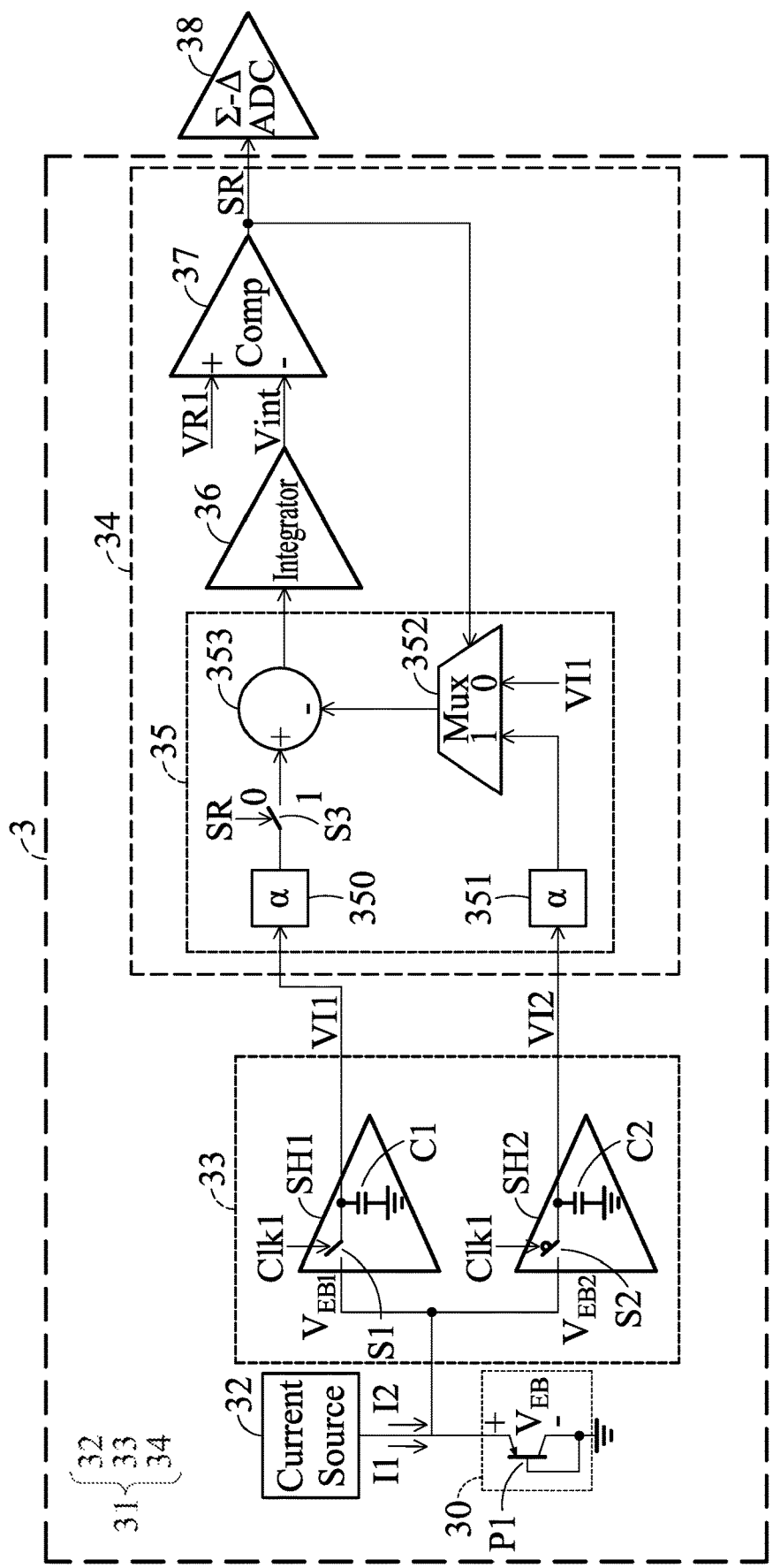
FIG. 3A illustrates a temperature sensor circuit, in accordance with some embodiments.

FIG. 3A illustrates a temperature sensor circuit 3, in accordance with some embodiments. The temperature sensor circuit 3 includes a temperature sensor 30 and a control circuit 31. The temperature sensor 30 is driven by the control circuit 31 to provide emitter-base voltages $V_{EB1}$, $V_{EB2}$ related to the temperature sensed. Particularly, the control circuit 31 generates a sensing result SR modulated by a difference dV. Since the difference dV is calculated based on the emitter-base voltages $V_{EB1}$, $V_{EB2}$ and related to the temperature sensed by the temperature sensor 30, the control circuit 31 converts the temperature information sensed into a duty cycle, or a pulse width of the sensing result SR through modulation. In at least one embodiment, by modulating the sensing result SR based on the difference dV, several advantages are achieved including, but not limited to, better linearity, higher resolution, lower cost, and the like. Further, the control circuit 31 comprises a current source 32, a sampling circuit 33, and a computing circuit 34. Details regarding the temperature sensor 30, the current source 32, and the sampling circuit 33 are substantially the same as described above for the temperature sensor 20, the current source 22, and the sampling circuit 23 with reference to FIG. 2, and are not repeated herein.

The computing circuit 34 comprises a modulating circuit 35, an integrator 36, and a comparator 37. The modulating circuit 35 is configured to generate a modulating signal Vm to adjust a pulse width of the sensing result SR according to the voltage information VI1, VI2, and the sensing result SR. More particularly, the sensing result SR output by the computing circuit 34 is a square wave, with positive and negative half cycles modulated by the voltage information VI1, VI2. In at least one embodiment, a time length of the positive half cycle of the sensing result SR is modulated to be negatively related to the sensed temperature, while a time length of each full cycle of the sensing result SR is controlled to be the same.

In at least one embodiment, the modulating circuit 35 is configured to provide the modulating signal Vm at a charging level corresponding to the difference dV resulting from subtracting the voltage information VI2 from the voltage information VI1 when the sensing result SR is at the enabled voltage level (i.e., logic 1). Further, the modulating circuit 35 is configured to provide the modulating signal Vm at a discharging level corresponding to the voltage information VI1 when the sensing result SR is at the disabled voltage level (i.e., logic 0). The integrator 36 is configured to receive and perform integration according to the modulating signal Vm to generate an integration signal Vint. The comparator 37 is configured to compare the integration signal Vint with a reference signal VR1 to generate the sensing result SR. For example, the comparator 37 may be a hysteresis comparator. The comparator 37 changes a value of the output sensing result SR from logic 0 to 1 when the reference signal VR1 is greater than the integration signal Vint by an offset voltage, and changes the value of the output sensing result SR from logic 1 to 0 when the reference signal VR1 is less than the integration signal Vint by the offset voltage. Thus, the temperature sensed by temperature sensor circuit 3 may be obtained in digital form by a sigma delta analog-to-digital (ADC) converter 38 by A-to-D converting the phase or pulse width of the sensing result.

In at least one embodiment, the modulating circuit 35 comprises voltage multipliers 350, 351, a multiplexer (MUX) 352, a switch S3, and a voltage subtractor 353. The voltage multiplier 350 has an input and an output. The input of the voltage multiplier 350 receives the voltage information VI1, and the voltage multiplier 350 is configured to provide an output signal at its output by multiplying the first voltage information VI1 by a value α. The switch S3 is coupled between the voltage multiplier 350 and the voltage subtractor 353. The switch S3 has an input coupled to the output of the voltage multiplier 350 and an output. Further, the switch S3 is controlled by the sensing result SR, is closed (conductive) when the sensing result SR is at the enabled voltage level (i.e., logic 1), and open (nonconductive) when the sensing result SR is at the disabled voltage level (i.e., logic 0). The voltage multiplier 351 has an input and an output. The input of the voltage multiplier 351 is coupled to receive the voltage information VI2, and the voltage multiplier 351 is configured to provide an output signal at the output by multiplying the voltage information VI2 by the value α. The MUX 352 has a first input coupled to the output of the voltage multiplier 351, a second input coupled to receive the voltage information VI1, an output, and a control input coupled to receive the sensing result SR. The MUX 352 is configured to provide the voltage of the first input on its output in response to the sensing result SR being at the enabled voltage level (i.e., logic 1), and to provide the voltage information VI1 on its output when the sensing result SR is at the disabled voltage level (i.e., logic 0). The voltage subtractor 353 has a first input ("+") coupled to the output of the switch S3, a second input ("−") coupled to the output of the MUX 352, and an output. The voltage subtractor 353 is configured to subtract the voltage received at the second input from the voltage received at the first input to generate the modulating signal Vm at the output.

Figure 3B:
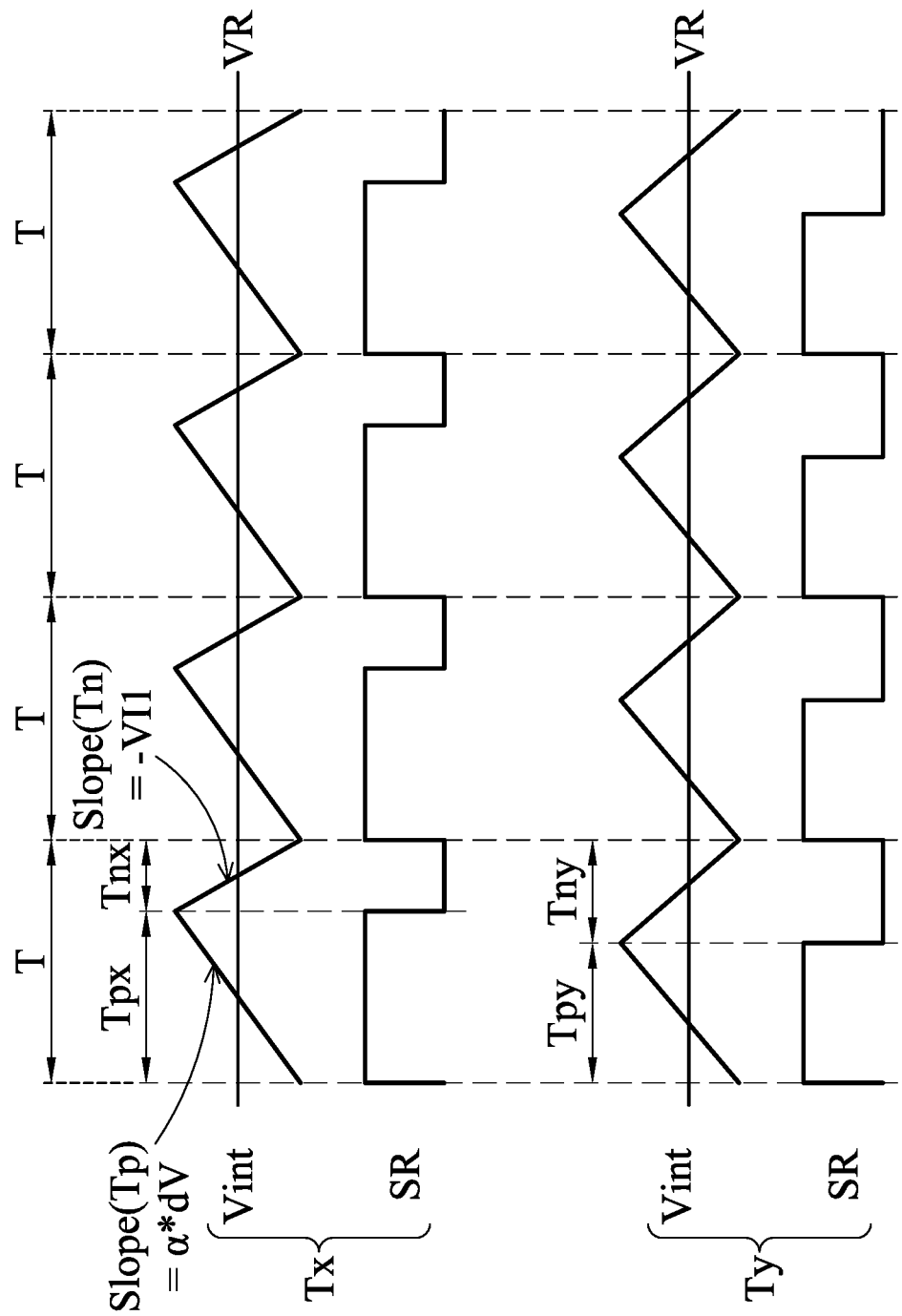
FIG. 3B illustrates operating waveforms of the temperature sensor circuit shown in FIG. 3A at different temperature, in accordance with some embodiments.

FIG. 3B illustrates operating waveforms of the temperature sensor circuit 3 at different temperatures Tx, Ty, in accordance with some embodiments. Particularly, upper and lower parts of FIG. 3B are voltage waveforms of the integration signal Vint and the sensing result SR of the temperature sensor circuit 3 when operated at the temperatures Tx and Ty, respectively, where the temperature Tx is lower than the temperature Ty.

In a period Tpx in the upper part of FIG. 3B, when the comparator 37 determines that the reference signal VR1 is greater than the integration signal Vint or greater than the integration signal Vint by the offset voltage, the comparator 37 outputs the sensing result SR at the enabled voltage level (i.e., logic 1). In response to receiving the sensing result SR at the enabled voltage level at the switch S3 and the control input of MUX 352, the modulating circuit 35 outputs the modulating signal Vm at the charging level. More particularly, the voltage subtractor 353 receives the voltage of α*VI1 at its first input and receives the voltage of α*VI2 at its second input when the sensing result SR is at logic 1. Thus, the voltage subtractor 353 outputs the modulating signal Vm at the voltage level of (α*VI1−α*VI2) when the sensing result SR is at the enabled voltage level (i.e., logic 1).

In a time period Tnx subsequent to the time period Tpx in upper part of FIG. 3B, when the comparator 37 determines that the reference signal VR1 is less than the integration signal Vint or less than the integration signal Vint by the offset voltage, the comparator 37 outputs the sensing result SR at the disabled voltage level (i.e., logic 0). In response to receiving the sensing result SR at the disabled voltage level, the modulating circuit 35 outputs the modulating signal Vm at the discharging level. More particularly, the voltage subtractor 353 receives the voltage of VI1 at the second input when the sensing result SR is at logic 0. Thus, the voltage subtractor 353 generates the modulating signal Vm at the voltage level of (−VI1) when the sensing result SR is at the disabled voltage level (i.e., logic 0).

With respect to the integration signal Vint, as can be seen, since the integrator 36 performs integration based on a slope of the voltage level of the modulating signal Vm. A rising slope of the integration signal Vint within the time period Tpx is equal to α*dV=α*(VI1−VI2), and a falling slope of the integration signal Vint within the time period Tnx is equal to −VI1. As discussed above in relation to FIGS. 1A-1C, the difference dV generated by the emitter-base voltages $V_{EB1}$, $V_{EB2}$ is positively related to local temperature sensed by the temperature sensor 30, so the rising slope of the integration signal Vint increases as the temperature increases. In other words, a time length of the positive half cycle of the sensing result SR is negatively related to the temperature sensed by the temperature sensor 30.

In at least one embodiment, the time length of each cycle of the sensing result is the same. Since the rising slope of the modulating signal Vm is equal to α*dV of a positive temperature coefficient, the falling slope of the modulating signal Vm may be determined based on a negative temperature coefficient for compensation. In at least one embodiment, the falling slope of the modulating signal Vm is equal to a negative value −VI1. A relationship of the voltage information VI1 with respect to local temperature is derived as follows:

$$dV1 = V_T \times \ln\frac{I_{C1}}{I_S}$$

$$V_T = \frac{kT}{q}$$

$$Is \propto n_i^2 = BT^3 e^{-Eg/(kT)},$$

where $n_i$ denotes intrinsic carrier density, B denotes a material-dependent parameter that is $7.3\times10^{15}$ cm$^{-3}$K$^{-3/2}$ for silicon, Eg denotes bandgap energy of silicon, k denotes Boltzmann's constant, T denotes local temperature, $V_T$ denotes thermal voltage, and q denotes elementary charge. Based on derivations above, the voltage information VI1 is dominated by the reverse saturation current $I_s$ since the reverse saturation current $I_s$ is proportional to the third power of the local temperature T. Thus, the voltage information VI1 (i.e., the emitter-base voltage $V_{EB1}$) of the BJT P1 decreases by about 2 mV for each rise of 1K in temperature.

Therefore, the rising and falling slopes of the modulating signal Vm are respectively equal to positive and negative temperature coefficients. In at least one embodiment, the value of α may be properly selected based on design parameters in order to keep the time length of each cycle of the sensing result SR to be the same.

In at least one embodiment, the value α is selected to result in a summation of the values α*(VI1−VI2) and VI1 to be constant in order to keep the time length of each cycle of the sensing result SR the same. More particularly, a ratio of time lengths of the time periods Tpx to Tpy can be represented as follows:

$$Tpx:Tnx = \frac{1}{\alpha \times dV} : \frac{1}{VI1} = VI1 : \alpha \times dV.$$

Since α*(VI1−VI2) and VI1 are respectively the rising and falling slopes of the modulating signal Vm within the time periods Tpx, Tnx, the time lengths of the time periods Tpx, Tnx are respectively inversely proportional to their slopes α*(VI1−VI2) and VI1. In view of the derivations shown above and substituting dV for (VI1−VI2), since the time lengths of the time periods Tpx to Tnx are respectively directly proportional to VI1 and α*dV, the time periods Tpx to Tnx can be respectively replaced by each of VI1 and α*dV being multiplied by a constant. Accordingly, a time length of a time period T equal to the sum of the time periods Tnx, Tpy can be represented as follows:

$$T=Tpx+Tpy=k\times VI1+k\times\alpha\times dV=k\times(VI1+\alpha\times dV),$$

where k denotes the constant. As a result, by setting the sum VI1+α*(VI1−VI2) to be constant, the total time length of each cycle of the sensing result SR can be accordingly fixed.

Comparing the upper and lower parts of FIG. 3B, the time period Tpx is longer than the time period Tpy. This is because the rising slope of the integration signal Vint is proportional to the sensed temperature, so the rising slope of the integration signal Vint corresponding to the temperature Tx, which is lower than the Temperature Ty, is less than the rising slope of the integration signal Vint corresponding to the temperature Ty, which results in the time period Tpx being longer than the time period Tpy.

In summary, the temperature sensor circuit 3 extracts the temperature information from the voltage information VI1, VI2 obtained from the temperature sensor 30 without additional reference signals or reference circuits. The extracted temperature information may be utilized for modulating the output sensing result SR and thus embedded as a duty cycle or pulse width of the output of the sensing result SR. In at least one embodiment, it is possible to achieve one or more advantages including, but not limited to, better linearity, higher resolution, lower cost, and the like.

Figure 4:
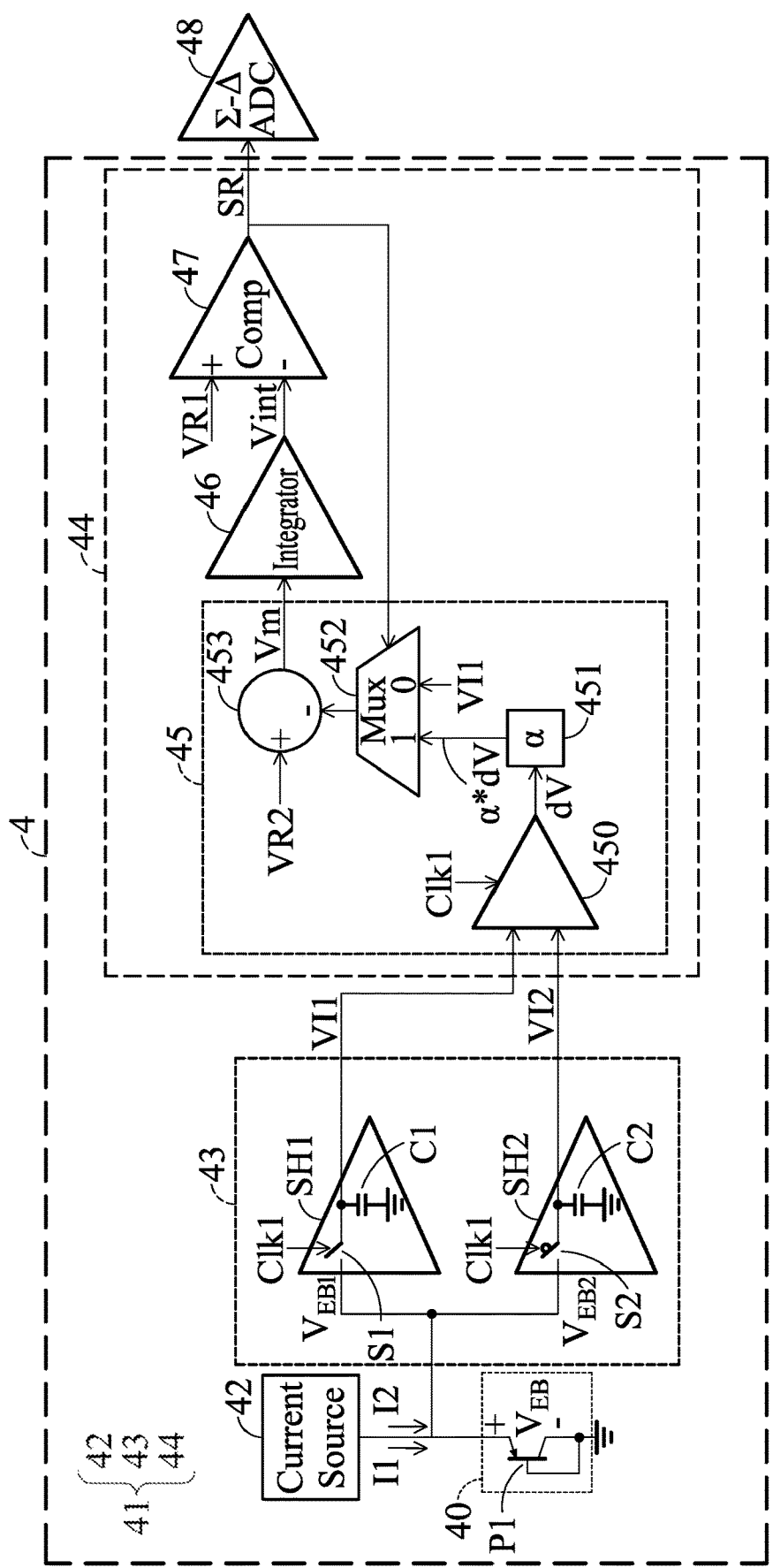
FIG. 4 illustrates a temperature sensor circuit, in accordance with some embodiments.

FIG. 4 illustrates a temperature sensor circuit 4, in accordance with some embodiments. The temperature sensor circuit 4 includes a temperature sensor 40 and a control circuit 41. The temperature sensor 40 is driven by the control circuit 41 to provide emitter-base voltages $V_{EB1}$, $V_{EB2}$ related to the temperature sensed. Particularly, the control circuit 41 generates a sensing result SR modulated by a difference dV. Since the difference dV is calculated based on the emitter-base voltages $V_{EB1}$, $V_{EB2}$ is related to the temperature sensed by the temperature sensor 40, the control circuit 41 converts the temperature information sensed into a duty cycle, or a pulse width, of the sensing result SR through modulation. Further, the control circuit 41 comprises a current source 42, a sampling circuit 43, and a computing circuit 44. The computing circuit 44 comprises a modulating circuit 45, an integrator 46, and a comparator 47. Details regarding the temperature sensor 40, the current source 42, the sampling circuit 43, the integrator 46, and the comparator 47 are substantially the same as described above for the temperature sensor 30, the current source 32, the sampling circuit 33, the integrator 36, and the comparator 37 with reference to FIGS. 3A, 3B, and are not repeated herein.

In at least one embodiment, the modulating circuit 45 is configured to generate a modulating signal Vm to adjust a pulse width of the sensing result SR according to the voltage information VI1, VI2, and the sensing result SR. More particularly, the sensing result SR output by the computing circuit 44 is a square wave, with its positive and negative half cycles modulated by the voltage information VI1, VI2. In at least one embodiment, a time length of the positive half cycle of the sensing result SR is modulated to be negatively related to the sensed temperature, while a time length of each full cycle of the sensing result SR is controlled to be the same. Thus, the temperature sensed by temperature sensor circuit 4 may be obtained in digital form by a sigma delta analog-to-digital (ADC) converter 48 by A-to-D converting the phase or pulse width of the sensing result SR.

In at least one embodiment, the modulating circuit 45 is configured to provide the modulating signal Vm at a charging level corresponding to the difference dV resulting from subtracting the voltage information VI2 from the voltage information VI1 when the sensing result SR is at the enabled voltage level (i.e., logic 1). Further, the modulating circuit 45 is configured to provide the modulating signal Vm at a discharging level corresponding to the voltage information VI1 when the sensing result SR is at the disabled voltage level (i.e., logic 0), so the integrator 46 performs integration based a voltage of the modulating signal Vm to generate an integration signal Vint. The comparator 47 compares the integration signal Vint with a reference signal VR1 to generate the sensing result SR. For example, the comparator 47 may be a hysteresis comparator. The comparator 47 changes a value of the output sensing result SR from logic 0 to 1 when the reference signal VR1 is greater than the integration signal Vint by an offset voltage, and changes the value of the output sensing result SR from logic 1 to 0 when the integration signal Vint is less than the reference signal VR1 by the offset voltage.

In at least one embodiment, the modulating circuit 45 comprises voltage subtractors 450, 453, a voltage multiplier 451, and a MUX 452. The voltage subtractor 450 has a first input receiving the voltage information VI1, a second input receiving the voltage information VI2, and an output. The voltage subtractor 450 is configured to be operated in response to the clock signal Clk1 to provide the difference dV of subtracting the voltage information VI2 from the voltage information VI1. For example, the voltage subtractor 450 is a correlated double sampling (CDS) circuit configured to subtract the voltage information VI2 from the voltage information VI1 to generate the voltage difference dV. The voltage multiplier 451 has an input coupled to the output of the voltage subtractor 450 and an output. The voltage multiplier 451 is configured to provide a voltage $\alpha*dV$ by multiplying the difference dV by a value α at the output of the voltage multiplier 451. The MUX 452 has a first input coupled to the output of the voltage multiplier 451, a second input coupled to receive the voltage information VI1, a control input coupled to receive the sensing result SR, and an output. The MUX 452 is configured to provide the voltage $\alpha*dV$ at its output when the sensing result SR is at the enabled voltage level (i.e., logic 1), and to provide the voltage information VI1 at its output when the sensing result SR is at the disabled voltage level (i.e., logic 0). The voltage subtractor 453 has a first input ("+") coupled to receive a reference signal VR2, a second input ("−") coupled to the output of the MUX 452, and an output. The voltage subtractor 453 is configured to subtract the voltage received at its second input from a voltage received at its first input to generate the modulating signal Vm at its output.

In at least one embodiment, the modulating circuit 45 generates the modulating signal Vm with its rising slope equal to $\alpha*dV=\alpha*(VI1-VI2)$ and falling slope equal to −VI1. As such, by properly selecting the value α based on design parameters, a time length of each complete cycle of the sensing result SR may be kept the same. Further, a time length of the positive half cycle of the sensing result SR is negatively related to the temperature sensed by the temperature sensor 40 since the rising slope of the modulating signal Vm to be integrated is equal to the difference dV, which is positively related to the sensed temperature.

In summary, the temperature sensor circuit 4 extracts the temperature information from the voltage information VI1, VI2 obtained from the temperature sensor without additional reference signals or reference circuits. The extracted temperature information may be utilized for modulating the output sensing result SR and thus embedded as duty cycle or pulse width of the output of the sensing result SR.

Figure 5:
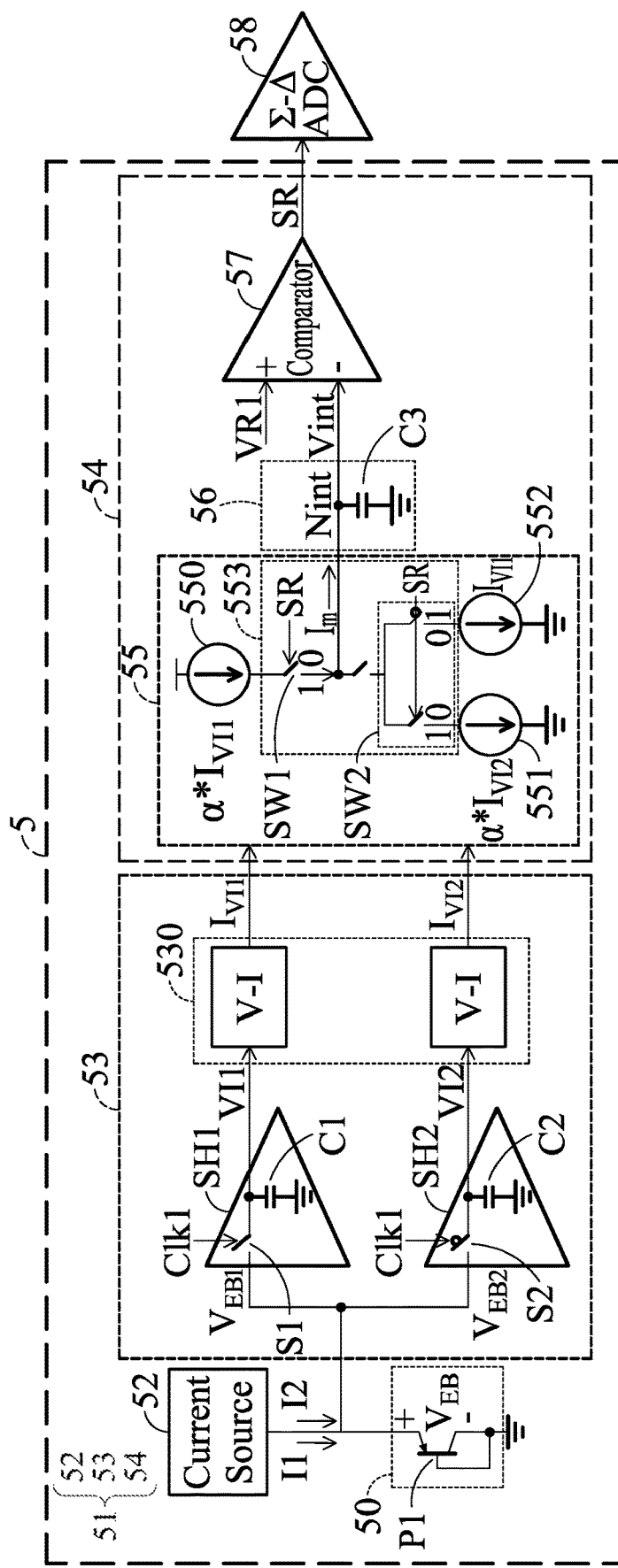
FIG. 5 illustrates a temperature sensor circuit, in accordance with some embodiments.

FIG. 5 illustrates a temperature sensor circuit 5, in accordance with some embodiments. The temperature sensor circuit 5 includes a temperature sensor 50 and a control circuit 51. The control circuit 51 comprises a current source 52, a sampling circuit 53, and a computing circuit 54. The computing circuit 54 comprises a modulating circuit an integrator 56, and a comparator 57. The sampling circuit 53 samples the emitter-base voltages $V_{EB1}$, $V_{EB2}$ from the temperature sensor 50 and converts them to the voltage information VI1, VI2 at corresponding voltage levels. Driven by currents corresponding to the voltage information VI1, VI2, the control circuit 51 is configured to perform integration based those currents to generate a sensing result SR, so that pulse widths of the sensing result SR are modulated by the voltage information VI1, VI2. Details regarding the temperature sensor 50, the current source 52, and the comparator 57 are substantially the same as described above for the temperature sensor 40, the current source 42, and the comparator 47 with reference to FIG. 4 and, are not repeated herein.

In at least one embodiment, in addition to the sample and hold circuits SH1, SH2, the sampling circuit 53 further comprises a voltage-to-current converter 530. After the sample and hold circuits SH1, SH2 receive and store the emitter-base voltage $V_{EB1}$, $V_{EB2}$, the voltage-to-current converter 530 is configured to receive convert voltage information VI1, VI2 and convert them to current signals $I_{V1}$, $I_{V2}$ corresponding to the voltage information VI1, VI2. That is, current levels of the current signals $I_{VT1}$, $I_{VT2}$ respectively correspond to the emitter-base voltages $V_{EB1}$, $V_{EB2}$. For example, the current signals $I_{V1}$, $I_{V2}$ are respectively positively related to the voltage information VI1, VI2.

Since the voltage information VI1, VI2 received from the sampling circuit 53 is represented as corresponding current signals $I_{VT1}$, $I_{VT2}$, the modulating circuit 55 controls a current of a modulating signal $I_m$ at a charging level or a discharging level by referencing the current signals $I_{VT1}$, $I_{VT2}$. Thus, the current of the modulating signal $I_m$ is integrated by the integrator 56 and the sensing result SR modulated by the current signals $I_{VT1}$, $I_{VT2}$ is generated to carry the temperature information. Thus, the temperature sensed by temperature sensor circuit 5 may be obtained in digital form by a sigma delta analog-to-digital (ADC) converter 58 by A-to-D converting the phase or pulse width of the sensing result SR.

In at least one embodiment, the modulating circuit 55 is configured to provide the modulating signal $I_m$ to a node Nint for integration. Specifically, the current of the modulating signal is controlled at a charging level corresponding to a difference of subtracting the current signal $I_{VT2}$ from the current signal $I_{VT1}$ when the sensing result is at the enabled voltage level (i.e., logic 1). Further, the current of the modulating signal $I_m$ is controlled at a discharging level corresponding to the current signal $I_{VT1}$ when the sensing result is at the disabled voltage level (i.e., logic 0). Then, the integrator 56 accumulates the currents of the modulating signal $I_m$ and generates an integration signal Vint. Particularly, the integrator 56 comprises a capacitor C3 coupled between a node Nint and the ground voltage. The capacitor C3 receives currents of the modulating signal $I_m$ and accumulates charge on the node Nint, and thus the currents of the modulating signal $I_m$ are integrated as the integration signal Vint on the node Nint. The integration signal Vint is received by the comparator 57 and compared with a reference signal VR1 to generate the sensing result SR. For example, the comparator 57 may be a hysteresis comparator. The comparator 57 changes a value of the output sensing result SR from logic 0 to 1 when the reference signal VR1 is greater than the integration signal Vint by an offset voltage, and changes the value of the output sensing result SR from logic 1 to 0 when the integration signal Vint is less than the reference signal VR1 by the offset voltage.

In at least one embodiment, the modulating circuit 55 is configured to generate the modulating signal $I_m$ at an appropriate current level to adjust a pulse width of the sensing result SR according to the current signals $I_{VT1}$, $IV_{T2}$, and the sensing result SR. More particularly, the sensing result SR output by the computing circuit 54 is a square wave, with its positive and negative half cycles modulated by the current signals $I_{VT1}$, $I_{VT2}$. In at least one embodiment, a time length of positive half cycle of the sensing result SR is modulated to be negatively related to the sensed temperature, while a time length of each cycle of the sensing result SR is controlled to be the same.

In at least one embodiment, the modulating circuit 55 comprises current sources 550-552 and a switching circuit 553. The current source 550 has a first end coupled to an operating voltage and a second end coupled to the node Nint. The current source 550 is configured to provide a current corresponding to the product of multiplying the current $I_{VT1}$ by a value α to the node Nint. The current source 551 has a first end coupled to the node Nint and a second end coupled to the ground voltage. The current source 551 is configured to direct a current corresponding to the product of multiplying the current $I_{VT2}$ by the value α from the node Nint. The current source 552 has a first end coupled to the node Nint and a second end coupled to the ground voltage. The current source 552 is configured to direct a current corresponding to the current $I_{VT1}$ from the node Nint.

In at least one embodiment, the modulating circuit 55 further comprises a switching circuit 553 comprising switches SW1, SW2. Specifically, the current sources 550-552 are coupled to the node Nint through the switching circuit 553. The switch SW1 is coupled between current source 550 and the node Nint to selectively provide the current α*$I_{VT1}$ to the node Nint. The switch SW2 comprises two switches ganged to operate together. The two switches SW2 are disposed between the node Nint and the respective first ends of current sources 551, 552. Accordingly, one of the switches SW2 is coupled between the node Nint and the current source 551 to extract the current α*$I_{VT2}$ from the node Nint. The other one of switches SW2 is coupled between the node Nint and the current source 552 to extract the current $I_{VT1}$ from the node Nint. The switching circuit 553 is coupled to the current sources 550-552 and the node Nint, and controlled by the sensing result SR to provide the modulating signal $I_m$ at a proper current level to the node Nint. Specifically, the switching circuit 553 is configured to couple the current sources 550, 551 to the node Nint when the sensing result SR is at the enabled voltage level (i.e., logic 1). Further, the switching circuit 553 is configured to couple the current source 552 to the node Nint when the sensing result SR is at the disabled voltage level (i.e., logic 0). In other words, when the sensing result SR is at the enabled voltage level (i.e., logic 1), the currents α*($I_{VT1}$−$I_{VT2}$) corresponding to the modulating signal $I_m$ at the charging level is provided to the node Nint. When the sensing result SR is at the disabled voltage level (i.e., logic 0), current corresponding to the modulating signal $I_m$ at the discharging level is provided to the node Nint.

Therefore, the integrator 56 performs integration based on currents corresponding to the modulating signal $I_m$ provided from the modulating circuit 55. When the sensing result SR is at the enabled voltage level (i.e., logic 1), the rising slope of the integration signal Vint is equal to α*(VI1−VI2), and when the sensing result SR is at the disabled voltage level (i.e., logic 0), the falling slope of the integration signal Vint is equal to −VI1. Therefore, the sensing result SR is modulated by the modulating signal $I_m$, so the time length of positive half cycle of the sensing result SR is negatively related to the temperature sensed since the difference between the currents $I_{VT1}$, $I_{VT2}$ corresponds to the difference between the voltage information VI1, VI2 and carries information related to the temperature sensed. Moreover, the time length of each cycle of the sensing result SR is controlled to be the same since the value α is selected for a summation of the values α*(VI1−VI2) and VI1 to be constant.

In summary, the temperature sensor circuit 5 generates the sensing result SR of sensed temperature from the voltage information VI1, VI2 obtained from the temperature sensor 50 without additional reference signals or reference circuits. Moreover, the sensing result SR is generated based on modulation controlled by current signals. In at least one embodiment, it is possible to achieve one or more advantages including, but not limited to, better linearity, higher resolution, lower loss, and the like.

Figure 6:
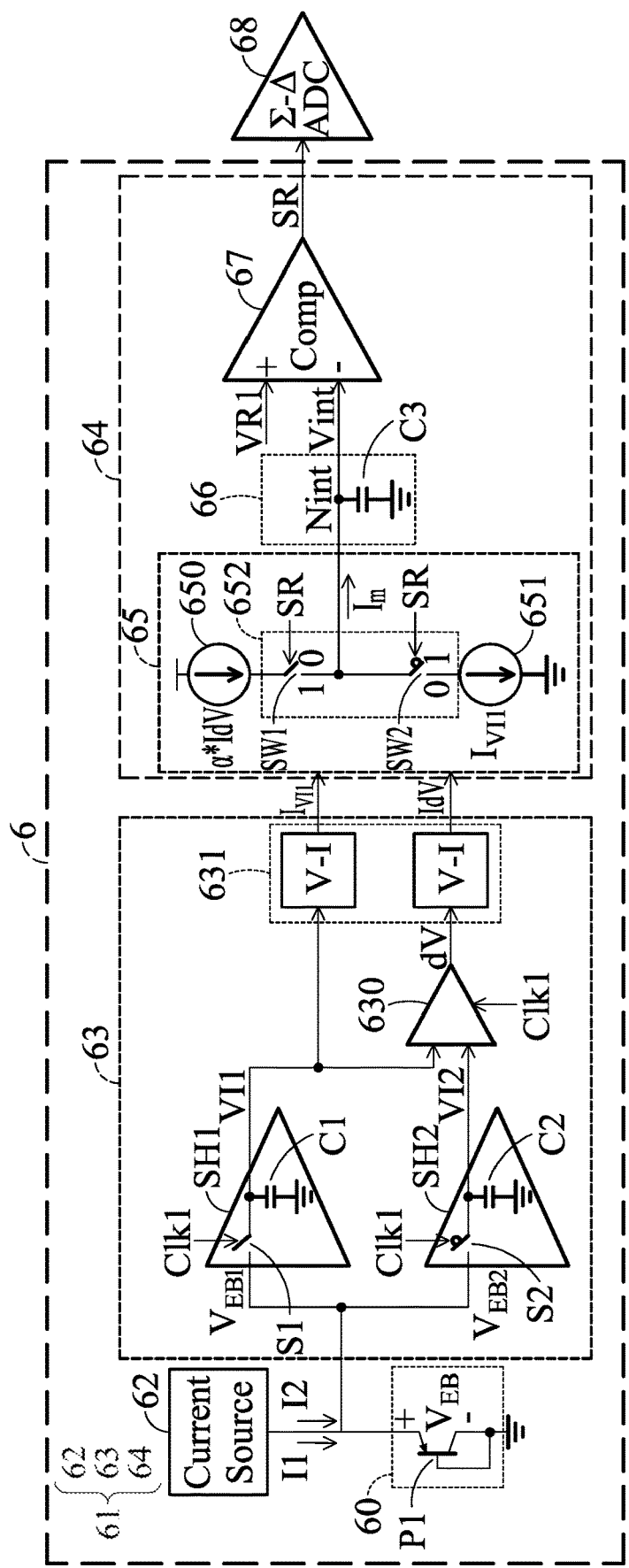
FIG. 6 illustrates a temperature sensor circuit, in accordance with some embodiments.

FIG. 6 illustrates a temperature sensor circuit 6, in accordance with some embodiments. The temperature sensor circuit 6 includes a temperature sensor 60 and a control circuit 61. The control circuit 61 comprises a current source 62, a sampling circuit 63, and a computing circuit 64. The computing circuit 64 comprises a modulating circuit 65, an integrator 66, and a comparator 67. In brief, the sampling circuit 63 samples the emitter-base voltages $V_{EB1}$, $V_{EB2}$ from the temperature sensor 60 and stores them as voltage information VI1, VI2. Further, the sampling circuit 63 converts the voltage information VI1, VI2 into current signals $I_{VT1}$, IdV respectively corresponding to the emitter-base voltage $V_{EB1}$, and a difference between the emitter-base voltages $V_{EB1}$, $V_{EB2}$. Driven by current signals $I_{VT1}$, IdV, the control circuit 61 is configured to perform integration based on current signals $I_{VT1}$, IdV to generate a sensing result SR, so pulse widths of the sensing result SR are modulated by the emitter-base voltage $V_{EB1}$, and a difference between the emitter-base voltages $V_{EB1}$, $V_{EB2}$. Details regarding the temperature sensor 60, the current source 62, the integrator 66, and the comparator 67 are substantially the same as described above for the temperature sensor 50, the current source 52, the integrator 56, and the comparator 57 with reference to FIG. 5 and, are not repeated herein.

In at least one embodiment, in addition to the sample and hold circuits SH1, SH2, the sampling circuit 63 further comprises a voltage subtractor 630 and a voltage to current converter 631. After the sample and hold circuits SH1, SH2 receive the emitter-base voltage $V_{EB1}$, $V_{EB2}$ and store them as the voltage information VI1, VI2, the voltage subtractor 630 calculates a difference dV by subtracting the voltage information VI2 from the voltage information VI1. For example, the voltage subtractor 630 is a correlated double sampling (CDS) circuit configured to subtract the voltage information VI2 from the voltage information VI1 to generate the difference dV. Further, the voltage-to-current converter 631 converts voltages of the voltage information VI1 and the difference dV respectively into the current signals $I_{VT1}$, IdV.

Since the modulating circuit 65 receives the current signals $I_{VT1}$, IdV from the sampling circuit 63, the modulating circuit 65 controls the modulating signal $I_m$ at an appropriate current level by referencing the current signals $I_{VT1}$, IdV. Thus, the current of the modulating signal $I_m$ is integrated by the integrator 66 and the sensing result SR modulated by the current signals $I_{VT1}$, IdV is generated to carry the temperature information. Thus, the temperature sensed by temperature sensor circuit 6 may be obtained in digital form by a sigma delta analog-to-digital (ADC) converter 68 by A-to-D converting the phase or pulse width of the sensing result SR.

In at least one embodiment, the modulating circuit 65 is configured to provide the modulating signal $I_m$ to a node Nint for integration. Specifically, a current of the modulating signal $I_m$ is controlled at a charging level corresponding to the voltage difference information IdV when the sensing result SR is at the enabled voltage level (i.e., logic 1). Further, the current of the modulating signal $I_m$ is controlled at a discharging level corresponding to the current signal $I_{VT1}$ when the sensing result SR is at the disabled voltage level (i.e., logic 0). Then, the integrator 66 accumulates currents of the modulating signal $I_m$ and generates an integration signal Vint. In at least one embodiment, the integrator 66 comprises a capacitor C3 coupled between the node Nint and the ground voltage. The capacitor C3 receives the modulating signal $I_m$ and accumulates charge on the node Nint, and thus the modulating signal $I_m$ is integrated as the integration signal Vint on the node Nint. The integration signal Vint is received by the comparator 67 and compared with a reference signal VR1 to generate the sensing result SR. For example, the comparator 67 may be a hysteresis comparator. The comparator 67 changes a value of the output sensing result SR from logic 0 to 1 when the reference signal VR1 is greater than the integration signal Vint by an offset voltage, and changes the value of the output sensing result SR from logic 1 to 0 when the integration signal Vint is less than the reference signal VR1 by the offset voltage.

In at least one embodiment, the modulating circuit 65 is configured to generate the modulating signal $I_m$ at an appropriate current level to adjust a pulse width of the sensing result SR according to the current signals $I_{VT1}$, IdV, and the sensing result SR. More particularly, the sensing result SR output by the computing circuit 64 is a square wave, with its positive and negative half cycles modulated by the current signal $I_{VT1}$ and the voltage difference information IdV. In at least one embodiment, a time length of the positive half cycle of the sensing result SR is modulated to be negatively related to the temperature sensed, while a time length of each cycle of the sensing result SR is controlled to be the same.

In at least one embodiment, the modulating circuit 65 comprises current sources 650, 651 and a switching circuit 652. Specifically, the current sources 650, 651 are coupled to the node Nint through the switching circuit 652. The switching circuit 652 includes switches SW1 and SW2. The current source 650 is coupled between the operating voltage and the node Nint to provide a current α*IdV to the node Nint. The current source 651 is coupled between the node Nint and the ground voltage to extract a current $I_{VT1}$ from the node Nint. The switching circuit 652 is coupled to the current sources 650, 651 and the node Nint, and controlled by the sensing result SR to provide the modulating signal $I_m$ at a proper current level to the node Nint. Specifically, the switch SW1 of the switching circuit 652 is configured to selectively couple the current source 650 to the node Nint when the sensing result SR is at the enabled voltage level (i.e., logic 1). Further, the switch SW2 of the switching circuit 652 is configured to selectively couple the current source 651 to the node Nint when the sensing result SR is at the disabled voltage level (i.e., logic 0). In other words, when the sensing result SR is at the enabled voltage level (i.e., logic 1), the modulating signal $I_m$ at the charging level corresponding to the value α*IdV is provided to the node Nint. When the sensing result SR is at the disabled voltage level (i.e., logic 0), the modulating signal $I_m$ at the discharging level corresponding to the current signal $I_{VT1}$ is provided to the node Nint.

Therefore, the integrator 66 performs integration based on currents corresponding to the modulating signal $I_m$ provided from the modulating circuit 65. When the sensing result SR is at the enabled voltage level (i.e., logic 1), the rising slope of the integration signal Vint is equal to α*(VI1−VI2), and when the sensing result SR is at the disabled voltage level (i.e., logic 0), the falling slope of the integration signal Vint is equal to VI1. The sensing result SR is modulated by the modulating signal $I_m$, so the time length of the positive half cycle of the sensing result SR is negatively related to the temperature sensed since the current IdV corresponds to the difference between the voltage information VI1, VI2 and carries information of the temperature sensed. Moreover, the time length of each cycle of the sensing result SR is controlled to be the same since the value α is selected for a summation of the values α*(VI1−VI2) and VI1 to be constant.

In summary, the temperature sensor circuit 6 generates the sensing result SR of sensed temperature from the voltage information VI1, VI2 obtained from the temperature sensor 60 without additional reference signals or reference circuits. Moreover, the sensing result SR is generated based on modulation controlled by current signals. In at least one embodiment, it is possible to achieve one or more advantages including, but not limited to, better linearity, higher resolution, lower loss, and the like.

Figure 7A:
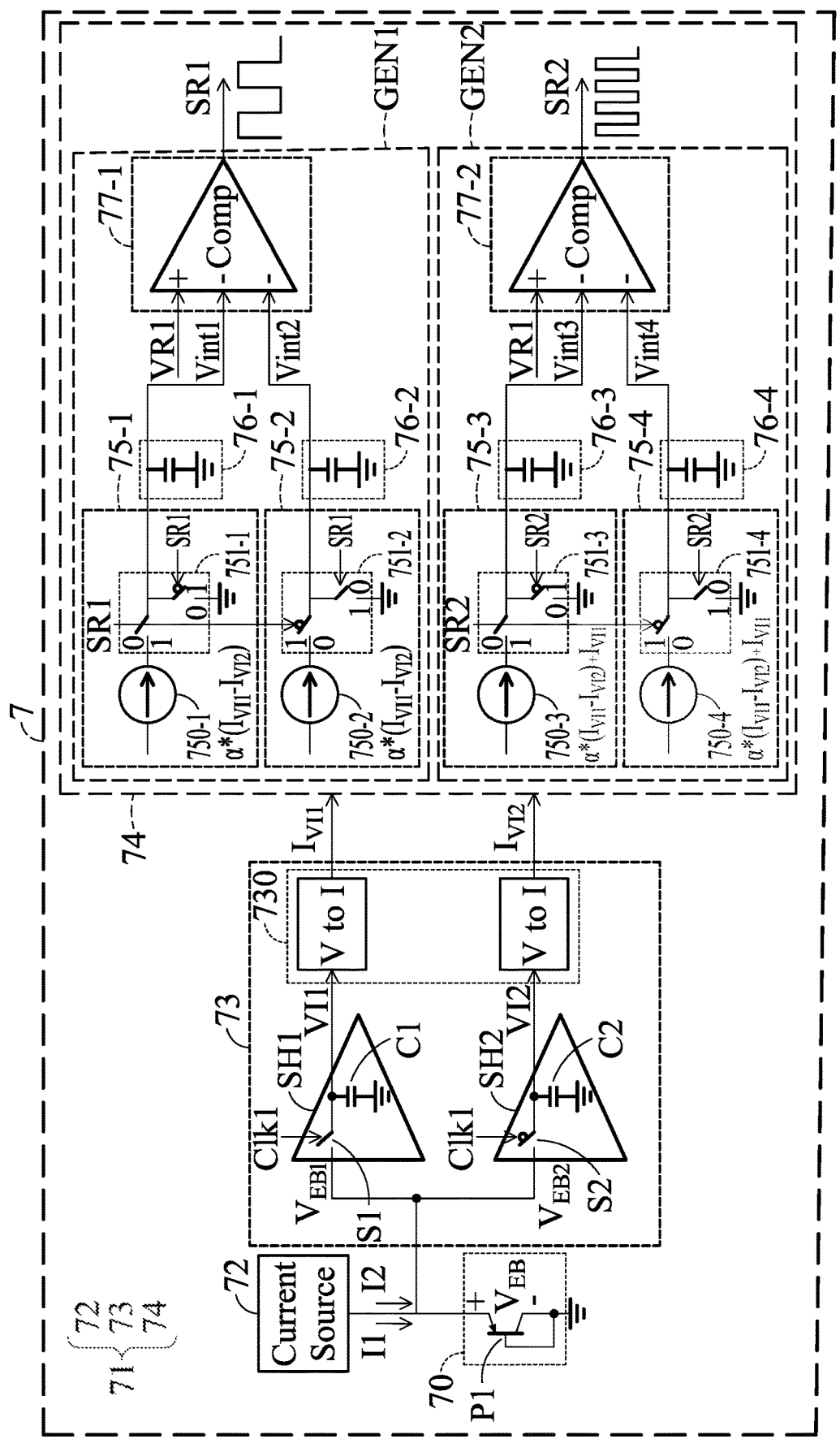
FIG. 7A illustrates a temperature sensor circuit, in accordance with some embodiments.

FIG. 7A illustrates a temperature sensor circuit 7, in accordance with some embodiments. The temperature sensor circuit 7 includes a temperature sensor 70 and a control circuit 71. The control circuit 71 comprises a current source 72, a sampling circuit 73, and a computing circuit 74. Details regarding the temperature sensor 70, the current source 72, and the sampling circuit 73 are substantially the same as described above for the temperature sensor 60, the current source 62, and the sampling circuit 63 with reference to FIG. 6, and are not repeated herein.

In at least one embodiment, the computing circuit 74 is configured to receive the voltage information VI1, VI2 as current signals $I_{VT1}$, $I_{VT2}$ provided by the sampling circuit 73, which includes a voltage-to-current converter 730 (FIG. 7A) configured to convert voltages of the voltage information VI1, VI2 respectively into the current signals $I_{VT1}$, $I_{VT2}$. The computing circuit 74 is configured to perform integration based on the voltage information VI1, VI2 provided as current signals $I_{VT1}$, $I_{VT2}$ to generate a sensing result SR1 carrying a temperature sensed by the temperature sensor 70 and a reference result SR2 independent from the temperature sensed.

In at least one embodiment, the computing circuit 74 comprises clock generators GEN1, GEN2 coupled to the sampling circuit 73. The clock generator GEN1 generates the sensing result SR1 oscillating at a frequency corresponding to the sensed temperature. Particularly, the clock generator GEN1 generates the sensing result SR1 oscillating at a frequency corresponding to a difference from subtracting the current signal $I_{VT2}$ from the current signal $I_{VT1}$. Since the current signals $I_{VT1}$, $I_{VT2}$ respectively correspond to the voltage information VI1, VI2, the temperature sensed is carried in the difference between the current signals $I_{VT1}$, $I_{VT2}$ and related to a frequency or a time length of each cycle of the sensing result SR1. In addition, the clock generator GEN2 generates a reference result SR2 oscillating at a frequency independent from to the sensed temperature. Particularly, the frequency of the reference result SR2 is determined based on the current signals $I_{T1}$, $I_{VT2}$ by the clock generator GEN2 to cancel out effects resulting from the temperature. Therefore, the computing circuit 74 generates the sensing result SR1 oscillating at the frequency corresponding to the sensed temperature. Meanwhile, the computing circuit 74 may generate another reference result SR2 oscillating at a frequency independent from the sensed temperature. Thus, the sensed temperature may be obtained by comparing the sensing result SR1 and the reference result SR2.

The clock generator GEN1 comprises modulating circuits 75-1, 75-2, integrators 76-1, 76-2, and a comparator 77-1. The modulating circuit 75-1 is coupled to the integrator 76-1 to provide an integration signal Vint1 to the comparator 77-1. The modulating circuit 75-1 comprises a current source 750-1 and a switching circuit 751-1. The current source 750-1 is configured to provide a current corresponding to a value α*(VI1−VI2), i.e., α*($I_{VT1}$−$I_{VT2}$) in FIG. 7A. The switching circuit 751-1 is controlled by the sensing result SR1 to selectively provide the current corresponding to the value α*(VI1−VI2) to the integrator 76-1.

In at least one embodiment, the modulating circuit 75-1 is configured to provide the current corresponding to the value α*(VI1−VI2) when the sensing result SR1 is at the enabled voltage level (i.e., logic 1). Further, the modulating circuit 75-1 is configured to provide the ground voltage when the sensing result SR1 is at the disabled voltage level (i.e., logic 0). As such, the modulating circuit 75-1 is configured to provide the current corresponding to the value α*(VI1−VI2) at positive half cycles of the sensing result SR1 to generate the integration signal Vint1, and reset the integration signal Vint1 to the ground voltage at negative half cycles of the sensing result SR1.

Similar to the modulating circuit 75-1, the modulating circuit 75-2 is coupled to the integrator 76-2 to provide an integration signal Vint2 to the comparator. The modulating circuit 75-2 comprises a current source 750-2 and a switching circuit 751-2. The current source 750-2 is configured to provide a current corresponding to a value α*(VI1−VI2), i.e., α*($I_{VT1}$−$I_{VT2}$) in FIG. 7A. The switching circuit 751-2 is controlled by the sensing result SR1 to selectively provide the current corresponding to a value α*(VI1−VI2) to the integrator 76-2.

In at least one embodiment, the modulating circuit 75-2 is configured to provide the current corresponding to the value α*(VI1−VI2) when the sensing result SR1 is at the disabled voltage level (i.e., logic 0). Further, the modulating circuit 75-2 is configured to provide the ground voltage when the sensing result SR1 is at the enabled voltage level (i.e., logic 1). As such, the modulating circuit 75-2 is configured to provide the current at negative half cycles of the sensing result SR1 to generate the integration signal Vint2, and reset the integration signal Vint2 to the ground voltage at positive half cycles of the reference result SR2.

Figure 7B:
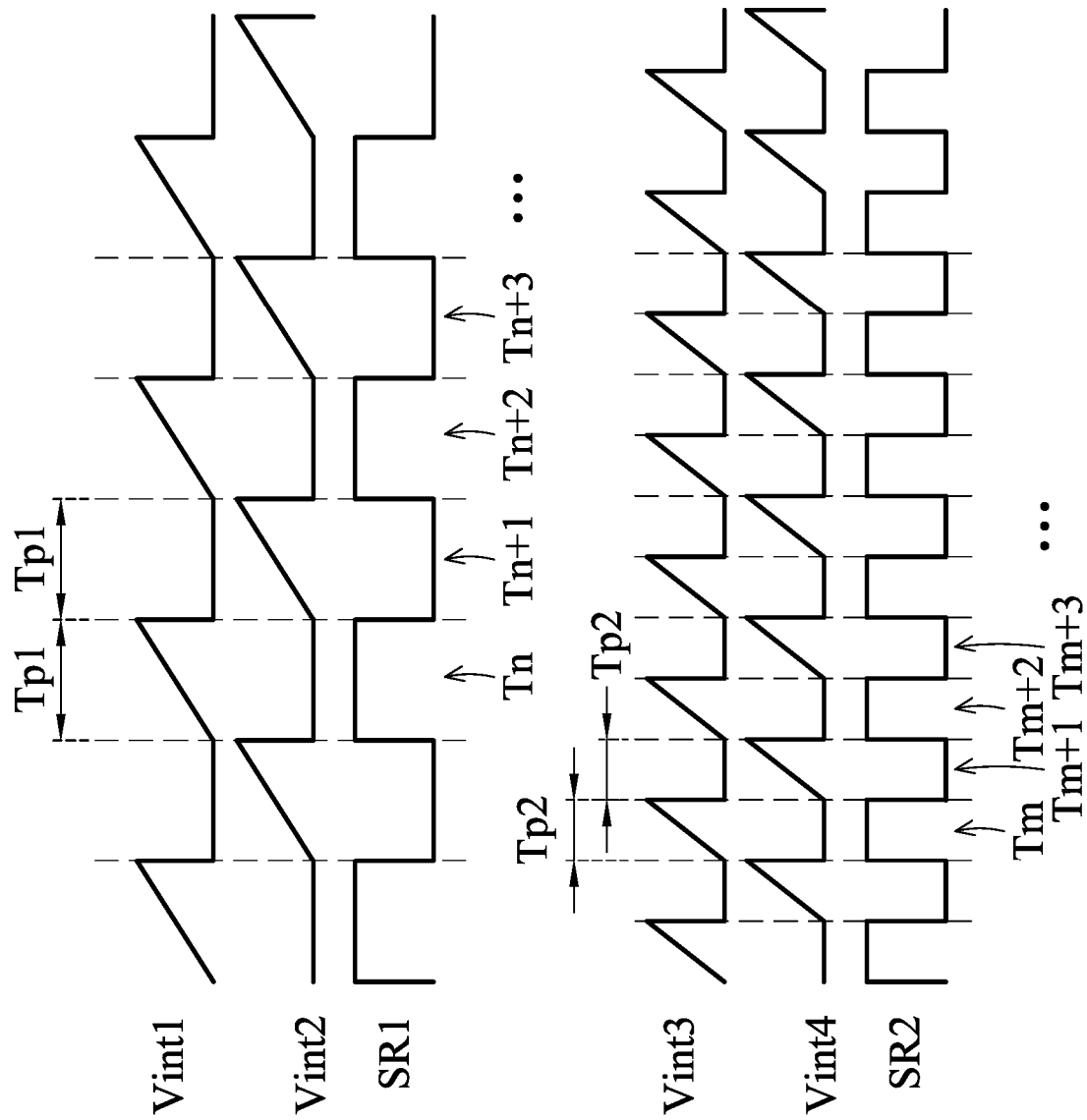
FIG. 7B illustrates operating waveforms of the temperature sensor circuit shown in FIG. 7A, in accordance with some embodiments.

FIG. 7B illustrates operating waveforms of the temperature sensor circuit 7, in accordance with some embodiments. More particularly, upper and lower parts in FIG. 7B respectively illustrate operating waveforms of the clock generators GEN1, GEN2.

As can be seen in upper part of FIG. 7B corresponding to the clock generator GEN1, in a time region Tn, since the sensing result SR1 is at the enabled voltage level, the switching circuit 751-1 provides the current to the integrator 76-1 for integration, resulting in a voltage of the integration signal Vint1 to rise. The rising slope of the integration signal Vint1 is directly proportional to the value α*(VI1−VI2). When the integration signal Vint1 is increased to be greater than the reference signal VR1, the output of the comparator 77-1 changes the value of the output sensing result SR1. Therefore, a length Tp1 of the time region Tn is inversely proportional to the value α*(VI1−VI2). Meanwhile in the time region Tn, a voltage of the integration Vint2 is reset to the ground voltage by the switching circuit 751-2.

Then, in a time region Tn+1 following the time region Tn, since the sensing result SR1 is at the disabled voltage level, the voltage of the integration Vint1 is reset to the ground voltage by the switching circuit 751-1. Meanwhile, the voltage of the integration signal Vint2 rises since the switching circuit 751-2 provides the current to the integrator 76-2. Similarly, the comparator 77-1 changes the value of the output sensing result SR1 when the integration signal Vint2 is increased to be greater than the reference signal VR1. Since the rising slope of the integration signal Vint2 within the time region Tn+1 is also directly proportional to the value α*(VI1−VI2), a length Tp1 of the time region Tn+1 is inversely proportional to the value α*(VI1−VI2). As a result, the sensed temperature is represented by the oscillating frequency of the sensing result SR1.

The clock generator GEN2 comprises modulating circuits 75-3, 75-4, integrators 76-3, 76-4, and a comparator 77-2. The modulating circuit 75-3 is coupled to the integrator 76-3 to provide an integration signal Vint3 to the comparator 77-2. The modulating circuit 75-3 comprises a current source 750-3 and a switching circuit 751-3. The modulating circuit 75-4 comprises a current source 750-4 and a switching circuit 751-4.

In at least one embodiment, the current source 750-3 is configured to provide a current corresponding to a value α*(VI1−VI2)+VI1. The switching circuit 751-3 is coupled between the current source 750-3 and the integrator 76-3 to selectively provide the current corresponding to the value α*(VI1−VI2)+VI1, i.e., α*($I_{VT1}$−$I_{VT2}$)+$I_{VT1}$ in FIG. 7A, from the current source 750-3 to the integrator 76-3. Particularly, the current corresponding to the value α*(VI1−VI2)+VI1 is provided when the reference result SR2 is at the enabled voltage level (i.e., logic 1). Further, the ground voltage is provided to the integrator when the reference result SR2 is at the disabled voltage level (i.e., logic 0). As such, the modulating circuit 75-3 is configured to provide the current at positive half cycles of the reference result SR2 to generate the integration signal Vint3, and reset the integration signal Vint3 to the ground voltage at negative half cycles of the reference result SR2. In at least one embodiment, the value α*(VI1−VI2)+VI1 is selected based on design parameters to cause the value α*(VI1−VI2)+VI1 to be constant over temperature, so a frequency of the generated reference result SR2 is independent of the sensed temperature.

Similar to the modulating circuit 75-3, the modulating circuit 75-4 is coupled to the integrator 76-4 to provide an integration signal Vint4 to the comparator 77-2. The modulating circuit 75-4 comprises a current source 750-4 and the switching circuit 751-4. The current source 750-4 is configured to provide a current corresponding to a value α*(VI1−VI2)+VI1, i.e., α*($I_{VT1}$−$I_{VT2}$)+$I_{VT1}$ in FIG. 7A. The switching circuit 751-4 is controlled by the reference result SR2 to selectively provide the current corresponding to a value α*(VI1−VI2)+VI1 to the integrator 76-4.

As can be seen in the lower part of FIG. 7B, in a time region Tm, since the reference result SR2 is at the enabled voltage level, the switching circuit 751-3 provides the current to the integrator 76-3 for integration, resulting in a voltage of the integration signal Vint3 to rise, and a rising slope of the integration signal Vint3 is directly proportional to the value α*(VI1−VI2)+VI1. When the integration signal Vint3 is increased to be greater than the reference signal VR1, the comparator 77-2 changes a value of the output reference result SR2. Since the value α*(VI1−VI2)+VI1 is independent of the sensed temperature, a length Tp2 of the time region Tm is also independent of temperature. Meanwhile in the time region Tm, a voltage of the integration Vint4 is reset to the ground voltage by the switching circuit 751-4.

Then, in a time region Tm+1 following the time region Tm, since the reference result SR2 is at the disabled voltage level, the voltage of the integration signal Vint3 is reset to the ground voltage by the switching circuit 751-3. Meanwhile, the voltage of the integration signal Vint4 rises since the switching circuit 751-4 provides the current to the integrator 76-4. Similarly, the comparator 77-2 changes the value of the output reference result SR2 when the integration signal Vint4 is increased to be greater than the reference signal VR1. As a result, the reference result SR2 independent of temperature is generated by the clock generator GEN2.

In summary, the temperature sensor circuit 7 generates the sensing result SR1 oscillating at the frequency related to the sensed temperature. Further, the temperature sensor circuit 7 also generates another reference result SR2 oscillating at another frequency independent from the sensed temperature. Thus, the sensed temperature may be obtained by comparing the sensing result SR1 with the reference result SR2. In at least one embodiment, it is possible to achieve one or more advantages including, but not limited to, reduced clock jitter and higher resolution, and the like through the interleaving architecture.

A person skilled in the art will now understand that other types of thermal sensor are within the scope of various embodiments. For example, the thermal sensor may include, but is not limited to, a complementary metal-oxide-silicon (CMOS) transistor, a thermal diode or other suitable semiconductor devices.

Figure 8:
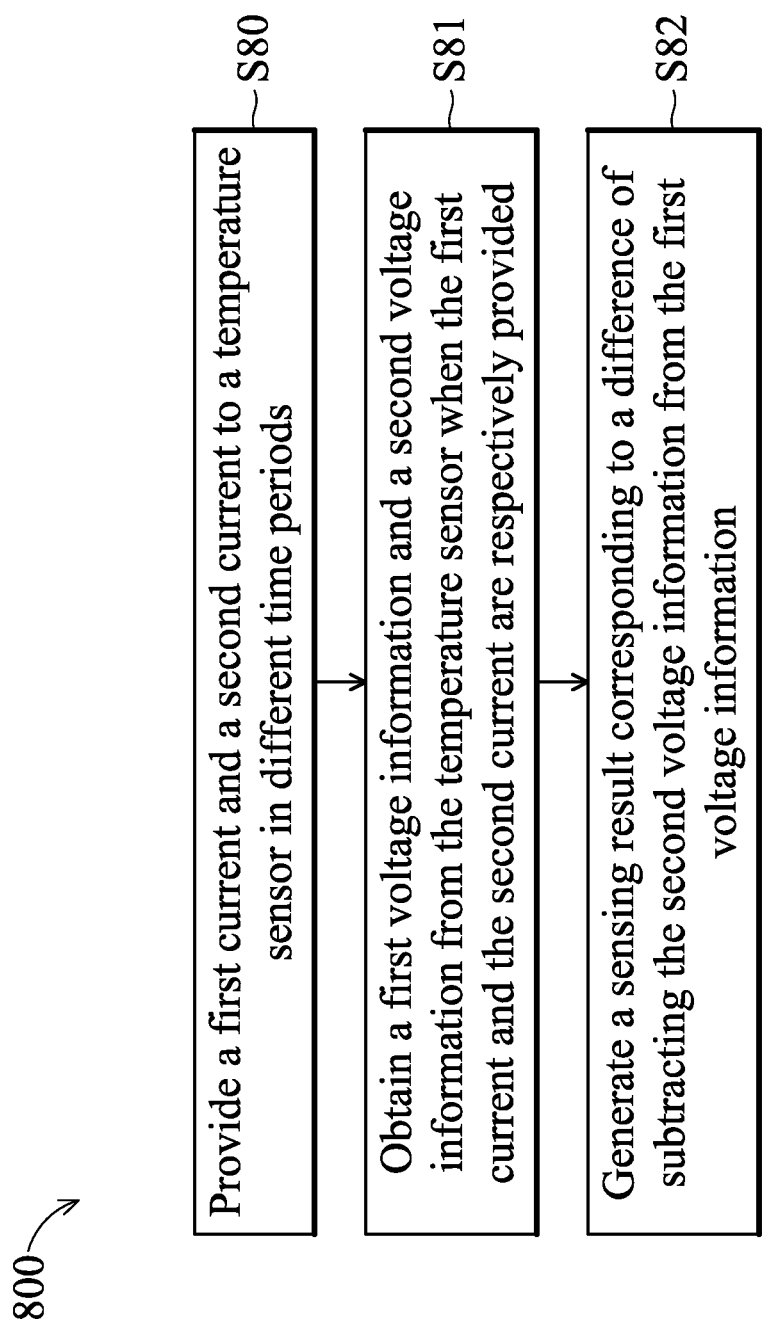
FIG. 8 illustrates an operating method of a temperature sensor circuit, in accordance with some embodiments.

FIG. 8 illustrates an operating method 800 of a temperature sensor circuit, in accordance with some embodiments. The operating method 800 may be executed by any one of the temperature sensor circuits 2-7 in FIGS. 2-7A. The operating method 800 comprises steps S80-S82.

In step S80, a first current and a second current are provided to the temperature sensor in different time periods. In step S81, a first voltage information and a second voltage information are obtained from the temperature sensor when the first current and second current are respectively provided. In step S82, a sensing result corresponding to a difference of subtracting the second voltage information from the first voltage information is generated.

As discussed in relation to FIGS. 1A-1C, when different currents are provided to the diode connected BJT, emitter-base voltages respectively corresponding to the currents are generated, and a difference between the voltages is positively related to the temperature of the location of the BJT. Therefore, the difference between the emitter-base voltages may be analyzed to obtain the temperature information without additional reference circuits or reference voltages, thereby saving manufacturing cost.

In an embodiment, a temperature sensor circuit comprises a temperature sensor and a control circuit. The control circuit is coupled to the temperature sensor and comprises a current source, a sampling circuit, and a computing circuit. The current source is configured to provide a first current and a second current to the temperature sensor in different time periods. The sampling circuit is coupled to the temperature sensor and configured to obtain and store a first voltage information and a second voltage information from the temperature sensor when the first current and second current are respectively provided. The computing circuit is coupled to the sampling circuit and configured to generate a sensing result corresponding to a difference of subtracting the second voltage information from the first voltage information.

In an embodiment, a control circuit is utilized for controlling a temperature sensor. The control circuit is coupled to the temperature sensor and comprises a current source, a sampling circuit, and a computing circuit. The current source is configured to provide a first current and a second current to the temperature sensor in different time periods. The sampling circuit is coupled to the temperature sensor and configured to obtain and store a first voltage information and a second voltage information from the temperature sensor when the first current and second current are respectively provided. The computing circuit is coupled to the sampling circuit and configured to generate a sensing result corresponding to a difference of subtracting the second voltage information from the first voltage information.

In an embodiment, a control method is performed for controlling a temperature sensor. The control method comprises providing a first current and a second current to the temperature sensor in different time periods; obtaining a first voltage information and a second voltage information from the temperature sensor when the first current and second current are respectively provided; and generating a sensing result corresponding to a difference of subtracting the second voltage information from the first voltage information.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A temperature sensor circuit, comprising:
a temperature sensor; and
a control circuit coupled to the temperature sensor and comprising:
a current source configured to provide a first current and a second current to the temperature sensor in different time periods;
a sampling circuit coupled to the temperature sensor and configured to obtain and store a first voltage information and a second voltage information from the temperature sensor when the first current and second current are respectively provided; and
a computing circuit coupled to the sampling circuit and configured to generate a sensing result corresponding to a difference of subtracting the second voltage information from the first voltage information.

2. The temperature sensor circuit of claim 1, wherein the temperature sensor comprises a diode connected bipolar junction transistor (BJT).

3. The temperature sensor circuit of claim 2, wherein the first voltage information and the second voltage information comprise voltage differences across the diode connected BJT when the first current and the second current are respectively provided to the temperature sensor.

4. The temperature sensor circuit of claim 1, wherein a voltage level of the sensing result corresponds to a temperature sensed by the temperature sensor.

5. The temperature sensor circuit of claim 1, wherein the computing circuit comprises a voltage subtractor configured to generate the sensing result by subtracting the second voltage information from the first voltage information.

6. The temperature sensor circuit of claim 1, wherein the sensing result comprises a square wave, and a duty cycle of the sensing result corresponds to a temperature sensed by the temperature sensor.

7. The temperature sensor circuit of claim 6, wherein a time length of each cycle of the sensing result is the same.

8. A control circuit for controlling a temperature sensor, the control circuit comprising:
a current source configured to provide a first current and a second current to the temperature sensor in different time periods;
a sampling circuit coupled to the temperature sensor and configured to obtain and store a first voltage information and a second voltage information from the temperature sensor when the first current and second current are respectively provided; and
a computing circuit coupled to the sampling circuit and configured to generate a sensing result corresponding to a difference of subtracting the second voltage information from the first voltage information.

9. The control circuit of claim 8, wherein the computing circuit further comprises:
a modulating circuit configured to generate a modulating signal to adjust a pulse width of the sensing result according to the first voltage information, the second voltage information, and the sensing result;
an integrator configured to integrate the modulating signal to generate an integration signal; and
a comparator configured to compare the integration signal with a reference voltage to generate the sensing result.

10. The control circuit of claim 9, wherein the modulating circuit is configured to:
provide the modulating signal at a charging level to subtract the second voltage information from the first voltage information when the sensing result is enabled; or
provide the modulating signal at a discharging level corresponding to the first voltage information when the sensing result is disabled.

11. The control circuit of claim 10, wherein the integrator comprises a voltage integrator, the modulating circuit further comprising:
a first voltage multiplier having an input and an output, the input coupled to receive the first voltage information, the first voltage multiplier being configured to provide a first multiplied voltage by multiplying the first voltage information by a predetermined value on its output;
a switch coupled to the first voltage multiplier having an input coupled to the output of the first voltage multiplier and an output, the switch being configured to be conductive when the sensing result is enabled and to be nonconductive when the sensing result is disabled;
a second voltage multiplier having an input and an output, the input coupled to receive the second voltage information, the second voltage multiplier being configured to provide a second multiplied voltage by multiplying the second voltage information by the predetermined value on its output;
a multiplexer (MUX) having a first input coupled to the output of the second voltage multiplier, a second input coupled to receive the first voltage information, an output, and a control input coupled to receive the sensing result, the MUX being configured to provide the second multiplied voltage at its output when the sensing result is enabled, and to provide the first voltage information at its output when the sensing result is disabled; and
a voltage subtractor having a first input coupled to the output of the switch, a second input coupled to the output of the MUX, and an output, the voltage subtractor being configured to subtract a voltage at the second input from a voltage at its first input to generate the modulating signal at its output.

12. The control circuit of claim 10, wherein the reference voltage comprises a first reference voltage, and the integrator comprises a voltage integrator, the modulating circuit further comprising:
a first voltage subtractor having a first input coupled to receive the first voltage information, a second input coupled to receive the second voltage information, and an output, the first voltage subtractor being configured to provide the difference of subtracting the second voltage information from the first voltage information;
a voltage multiplier having an input coupled to the output of the first voltage subtractor and an output, the voltage multiplier being configured to provide a multiplied voltage at its output by multiplying the difference by a predetermined value;
a multiplexer (MUX) having a first input coupled to the output of the voltage multiplier, a second input coupled to receive the first voltage information, a control input coupled to receive the sensing result, and an output, the MUX being configured to provide the multiplied voltage at its output when the sensing result is enabled, and to provide the first voltage information at its output when the sensing result is disabled; and a second voltage subtractor having a first input coupled to receive a second reference voltage, a second input coupled to the output of the MUX, and an output, the second voltage subtractor being configured to subtract a voltage at its second input from a voltage at its first input to generate the modulating signal at its output.

13. The control circuit of claim 10, wherein the reference voltage comprises a first reference voltage, and the integrator comprises a capacitor having a first end coupled to the comparator and a second end coupled to a second reference voltage, the modulating circuit comprising:

a first current source having a first end coupled to a third reference voltage and a second end, the first current source being configured to provide at its second end a first multiplied current corresponding to multiplying the first voltage information by a predetermined value;

a second current source having a first end and a second end, the second end of the second current source coupled to the second reference voltage, the second current source being configured to provide at its second end a second multiplied current corresponding to multiplying the second voltage information by the predetermined value;

a third current source having a first end and a second end, the second end of the third current source coupled to the second reference voltage, the third current source being configured to provide a third multiplied current to the second end corresponding to the first voltage information; and a switching circuit, coupled to the second end of the first current source, the first end of the second current source, the first end of the third current source, and the first end of the capacitor, the switching circuit being configured to couple the second end of the first current source and the first end of the second current source to the first end of the capacitor when the sensing result is enabled, and configured to couple the first end of the third current source to the first end of the capacitor when the sensing result is disabled.

14. The control circuit of claim 10, wherein the reference voltage is a first reference voltage, and the integrator comprises a capacitor having a first end coupled to the comparator and a second end coupled to a second reference voltage, the modulating circuit comprising:

a first current source having a first end coupled to a third reference voltage and a second end, the first current source being configured to provide at its second end a first current corresponding to multiplying the difference by a predetermined value;

a second current source having a first end and a second end, the second end of the second current source coupled to the second reference voltage, the second current source being configured to provide a second current corresponding to the first voltage information received at its second end; and a switching circuit coupled to the second end of the first current source, the first end of the second current source, and the first end of the capacitor, the switching circuit being configured to couple the second end of the first current source to the first end of the capacitor when the sensing result is enabled, and configured to couple the first end of the second current source to the first end of the capacitor when the sensing result is disabled.

15. A control method of controlling a temperature sensor, the control method comprising:

providing a first current and a second current to the temperature sensor in different time periods;

obtaining a first voltage information and a second voltage information from the temperature sensor when the first current and second current are respectively provided; and generating a sensing result corresponding to a difference of subtracting the second voltage information from the first voltage information.

16. The control method of claim 15, wherein the sensing result oscillates at a first frequency corresponding to the difference of subtracting the second voltage information from the first voltage information.

17. The control method of claim 16, comprising:

providing a first multiplied current corresponding to multiplying the difference by a predetermined value;

selectively integrating the first multiplied current to generate a first integration signal;

providing a second multiplied current corresponding to multiplying the difference by the predetermined value;

selectively integrating the second multiplied current to generate a second integration signal; and comparing the first integration signal or the second integration signal with a reference voltage to generate the sensing result, wherein the first multiplied current and the second multiplied current are integrated at complementary time periods.

18. The control method of claim 16, further comprising:

generating a reference result oscillating at a second frequency independent from a temperature sensed by the temperature sensor.

19. The control method of claim 18, comprising:

providing a third multiplied current corresponding to a sum of the first voltage information and a product of multiplying the difference by a predetermined value;

selectively integrating the third multiplied current to generate a third integration signal;

providing a fourth multiplied current corresponding to the sum of the first voltage information and the product of multiplying the difference by the predetermined value;

selectively integrating the fourth multiplied current to generate a fourth integration signal; and comparing the third integration signal or the fourth integration signal with a reference voltage to generate the reference result, wherein the third multiplied current and the fourth multiplied current are integrated at complementary time periods.

20. The control method of claim 19, wherein the temperature is obtained by comparing the first frequency of the sensing result with the second frequency of the reference result.

* * * * *